United States Patent [19]

Kehler

[11] 3,856,028
[45] Dec. 24, 1974

[54] MOWER CLEANING APPARATUS

[76] Inventor: Gordon W. Kehler, P.O. Box 169, Fallbrook, Calif. 92028

[22] Filed: Mar. 12, 1973

[21] Appl. No.: 340,598

[52] U.S. Cl............................ 134/198, 239/DIG. 6
[51] Int. Cl.............................................. B08b 3/00
[58] Field of Search........ 239/DIG. 6, 279; 320/1 R; 134/198, 199

[56] References Cited
UNITED STATES PATENTS

| | | | |
|---|---|---|---|
| 2,262,767 | 11/1941 | Jeter | 134/198 |
| 3,028,988 | 4/1962 | Owens | 220/1 R |
| 3,108,608 | 10/1963 | Mahowald | 134/198 |
| 3,322,347 | 5/1967 | Pierce | 239/DIG. 6 |

Primary Examiner—Lloyd L. King
Attorney, Agent, or Firm—John E. Wagner

[57] ABSTRACT

A lawn mower cleaning device involving basically a platform suitably dimensioned to supporting a rotary type lawn mower and including in a central recess, a supply preferably in circular form of water jets directed upward into the underside of the pan or housing of a rotary mower. The device includes a hose bib connection. In one embodiment the platform is basically flat. In another embodiment it includes side walls which serve to capture debris which is dislodged by operation of the apparatus for easy removal and to protect the operator from unintentional contact with the mower during connection of the water supply in the cleaning operation.

6 Claims, 8 Drawing Figures

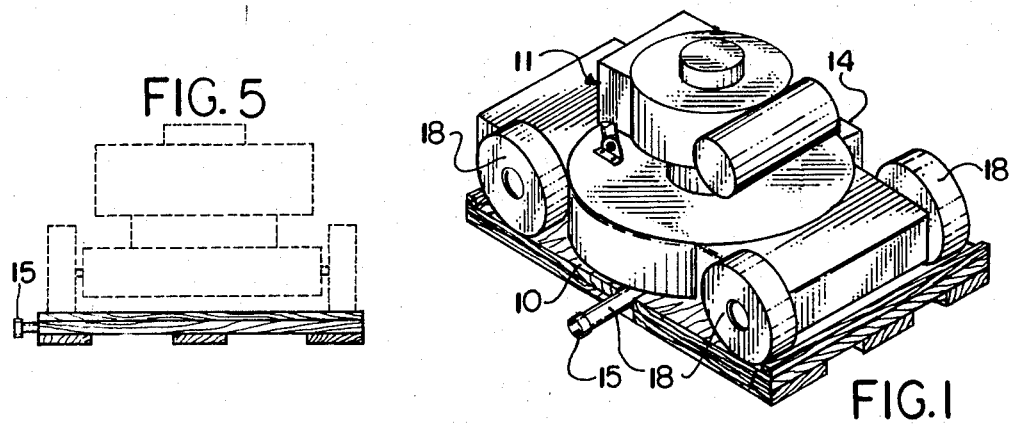
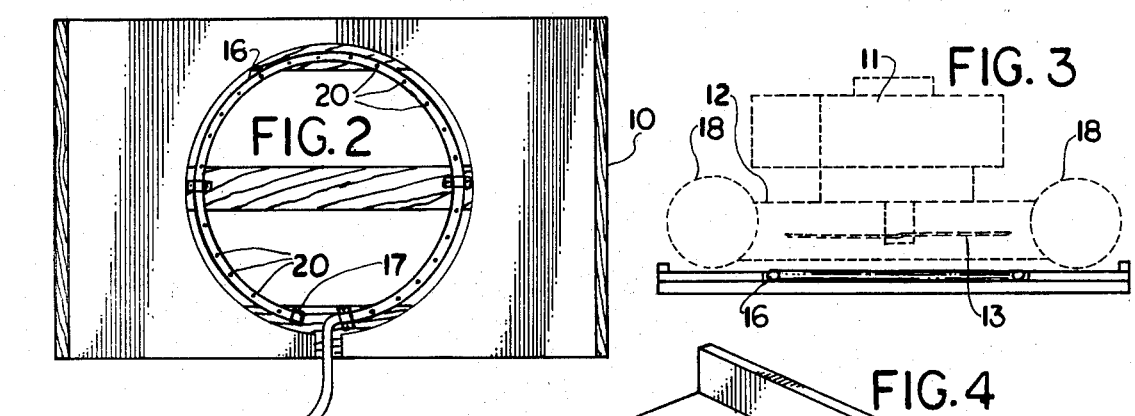
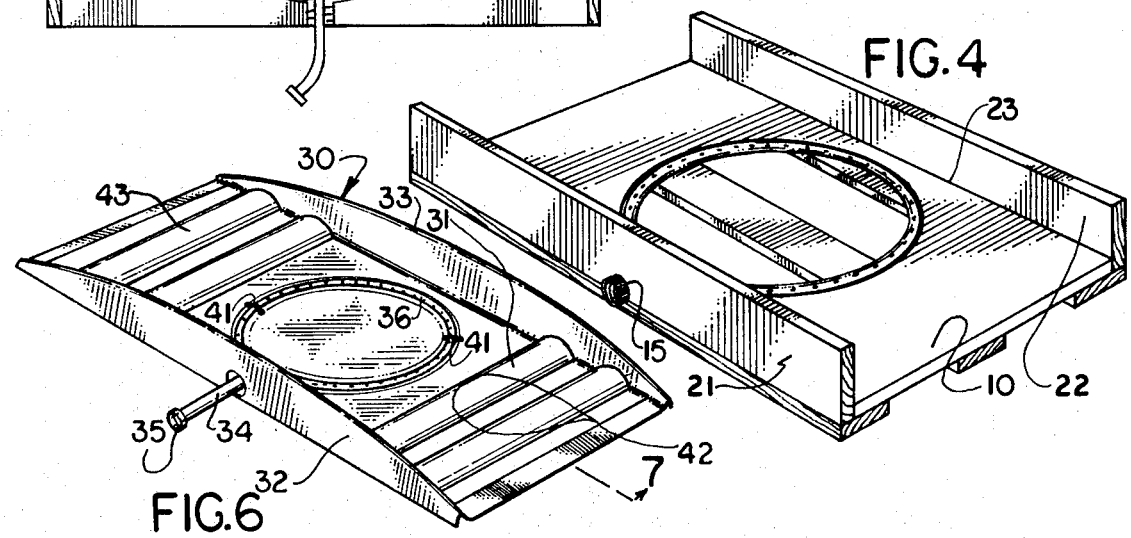
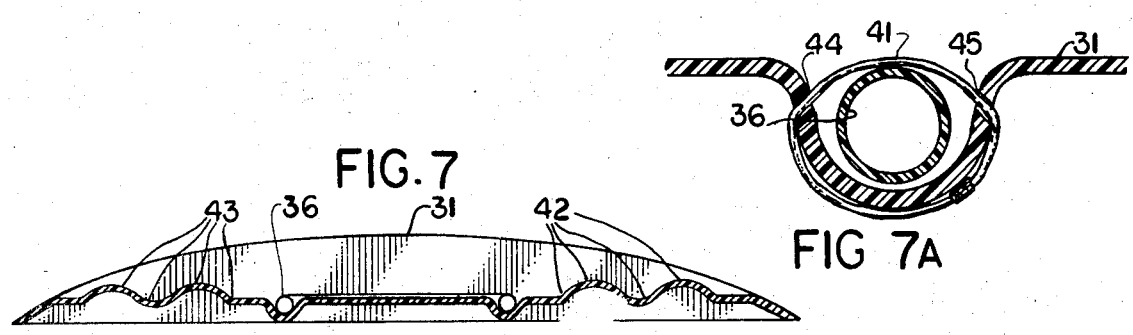

3,856,028

1

MOWER CLEANING APPARATUS

BACKGROUND OF THE INVENTION

With the advent of rotary type lawn mowers as compared with the early conventional reel type mower, the mowing of taller, tougher grass has been possible. Likewise the mowing of damp grass which becomes extremely difficult with reel type mowers can easily be accomplished with rotary mower. One of the problems of rotary mower is the tendency of cut grass particles, particularly when damp, to be driven with sufficient force against the underside of the housing to adhere thereto and become compacted and in some cases obstruct the rotation of the cutting blade. There is an unfortunate tendency of unskilled persons to attempt to clear such collected grass using a stick or other object while the mower is operating with ultimate disastrous results. Even with the mower stopped, it must be inverted or turned on its side to be cleaned with the danger of leakage of gasoline on the exhaust manifold, another undesired occurence. It has been recognized that rotary mowers may be cleaned when water is introduced into the underside of the housing with the motor operating. The rotating blade serves to throw water particles outward with sufficient force to dislodge the particles which then fall to the ground or are discharged outward to the normal discharge opening. A number of patents show attachments or integral cleaning devices employing water from the water supply wuch as a hose. This prior art is represented by the following patents:

| 3,490,212 | Hengesbach |
| 2,936,563 | Blume |
| 3,648,446 | Haapoja |
| 3,214,893 | Griffin |
| 3,040,990 | Gotti |

BRIEF STATEMENT OF THE INVENTION

I have discovered that a simple yet effective device for cleaning rotary mowers while operating is a platform with the recessed water supply over which the mower is driven periodically during its normal mowing operation. The platform mounted water dispenser is connected by typical garden hose to a water supply. The water supply may, if desired, be left on at a low level while the mowing occurs and periodically the mower may be driven over the platform.

The above eliminates the need for any special parts of the mower and further and more important, eliminates the need for any manipulative steps with the mower while running in the cleaning operation. There is no need to make water connections to the mower nor any need to leave the mower unattended while turning water supply on.

DETAILED DESCRIPTION OF THE DRAWINGS:

These features of this invention may be more clearly understood from the following detailed description and by reference to the drawings in which:

FIG. 1 is a perspective view of a conventional rotary mower in position on the platform of this invention;

FIG. 2 is a top plan view of the apparatus of FIG. 1;

FIG. 3 is a side sectional view of the apparatus of FIG. 1 shown or taken along lines 3—3 of FIG. 1;

FIG. 4 is a perspective view of a second embodiment of this invention;

2

FIG. 5 is a vertical sectional view of the apparatus of FIG. 4 taken along line 5—5 of FIG. 4;

FIG. 6 is a perspective view of a third embodiment of this invention;

FIG. 7 is a vertical sectional view taken along line 7—7 of FIG. 5; and

FIG. 7a is a detailed fragmentation sectional view of FIG. 7.

DETAILED DESCRIPTION OF THE INVENTION

Now referring to FIG. 1 in conjunction with FIG. 2 it may be seen that the apparatus of this invention comprises basically a platform 10 dimensioned to allow a conventional 16 to 23 inch rotary type lawn mower 11 having a housing or pan 12 enclosing a rotating cutting blade 13 (shown in FIG. 3) and a discharge opening 14 to be driven up onto the platform. I have found that a platform having the dimensions of 36 inches by 26 inches with a height in the order of three-fourths inch works emminently well. In the case of larger mowers, a small degree of overhang of the platform is of no significance.

At one side of the platform existing from its body portion or thickness is a hose connection 15 designed to mate with the conventional hose coupling used for lawn watering. This hose connection 15 as may be seen in FIG. 2 is coupled to the end of a generally circular sprayer tube 16 having a closed end 17 and plurality of upward direction outlet openings 20. The closed end 17 may optionally have a removable end plug for cleaning. The tube 16 and its associated working parts are recessed at or below the level of the top surface of platform 10 so that they will not interfere or contact any working parts of the mower, particularly the rotating blade 13.

In have found that ideal dimension and placement tubular member 16 is the diameter in the order of 16 inches generally centered on the platform 10 between positions for each of the four wheels 18 of the mower so that the spray will be intercepted by a rotating blade 13 the under side of the mower. This dimensional relationship is shown in FIG. 3 with the mower 11 shown in phantom. A suitable material for the tube is soft aluminum tubing of the type sometimes used in lawn sprayers although the material is not of critical importance. It can be perfectly feasible that the platform and tube supply be unitary with the water passage either molded or formed into the platform which may be made of either molded plastic or formed sheet metal. I have found however that a wood platform and aluminum tube 16 are inexpensive and fully effective in carrying out the invention.

One of the disadvantages noted above in the prior art is a necessity of the user to make some physical connection to the mower which slows down the cleaning operation and also can be dangerous. The prior art devices necessitate a person's hands being close to the mower housing since the mower is normally running during this setup operation as well as during cleaning. With these thoughts in mind, I have invented an alternate embodiment shown in FIG. 4, which in addition to the platform, includes a pair of side walls which serve to confine the mower slightly and also remove the operator's hands farther from the mower. In this case, note that the hose bit connection is outside of the platform 10 and protected by a side wall 21. Therefore, in the connection operation of a mower may be in place on the platform running and there is virtually no danger of the operator's hands contacting the dangerous working parks of the mower. The embodiment of FIG. 4 also includes a second side wall 22 which serves to trap the debris which is dislodged by the cleaning operation. Entrapment occurs in a corner 23 and after a mower is cleaned, it may be easily scooped out and removed. The nature of protection afforded by the side walls 21 is apparent in FIG. 5 where the vertical wall 21 is in the order of 4 or 5 inches high and extends to the general height of the top of a mower housing 11. The opposite side wall 22 which is adjacent to the position of the discharge opening of the mower in position to capture a large quantity of debris from under the mower and prevented from being thrown onto the yard.

One additional advantage of the apparatus in accordance with this invention is that it may be used as a lawn sprinkler providing a circular pattern in the case of the embodiment of FIG. 4, FIGS. 1 and 2 or a rectangular pattern, the case of the embodiment of 4 and 5.

In each of the embodiments above, the main body of the mower cleaning device is illustrated as planar and normally manufactured from wood. In the interest of simplicity and economy, the cleaning device, in accordance with this invention may also be manufactured from metal or plastic and a particularly desirable form is illustrated in FIG. 6.

Now referring to FIG. 6. The cleaning device is unitary and formed from plastic material, for example, polyethelyne, having a thickness in the order of one-sixteenth inch to one-quarter inch in thickness.

It comprises a body generally designated 30 including a tray portion 31 and one or more side walls 32 and 33. The side wall 32 includes an opening for the water conduit 34 similar to the conduit 16 of the previous embodiments. The conduit 34 includes an end coupling 35 and a circular portion 36 having a plurality of openings 40 similar to the opening 20. The conduit 36 lies in a generally circular recess and is held in place by securing means such as ties 41. Depending upon the plastic forming, the conduit may be integral with the body 30 but for simplicity sake is shown as a separate member.

The wall 32 provides the protective feature as described above for the operator while the wall 33 on the opposite side is of lower height and provides principally the function of additional stiffness to the body 30. One additional feature apparent in FIG. 6 is the plurality of transverse grooves forming a generally corrugated platform at the entrance and exit regions of the platform 31. These grooves 42 and 43 serve to craddle the wheels of the mower and prevent the mower from inadvertently rolling off the platform if the operator is not holding on to its handle and provides additional function that cleaning may be facilitated by moving the mower forward and backward across the corrugations tending to vibrate the mower and facilitate the cleaning.

Each of these features of the unitary plastic or metal embodiment are illustrated in FIG. 7 and particularly the grooves 43 and 42. FIG. 7 and FIG. 7a show the positioning of the conduit in an integral recess which depending upon the plastic memory of the material used may be sufficient to grasp the conduit and hold it but to avoid the possibility of the conduit becoming dislodged and arising out of its recess. We have shown in FIG. 7a securing means such as wire or plastic binder passing through holes 44 and 45 at the edge of the conduit recess.

The above described emobodiments of this invention are merely descriptive of its principles and are not to be considered limiting. The scope of this invention instead shall be determined from the scope of the following claims including their equivalents.

What is claimed is:

1. A rotary lawn mower cleaning device comprising a generally elongated body adapted to rest on a lawn;

said body including a platform of sufficient size to support a rotary lawn mower thereon and including an entrance portion to said platform and an exit portion at the opposite end thereof;

said platform including a surface engaging the wheels of a lawn mower on the platform to resist its rolling movement thereon;

said body including at least one side wall extending along said platform of height greater than said entrance and exit portions of said platform;

water discharge means supported in a central portion of said platform;

said water discharge means generally including a plurality of discharge openings directed upward from said platform; and means extending through said side wall for connecting said water discharge means to a water supply.

2. The combination in accordance with claim 1 including a pair of side walls secured to said platform spaced apart a sufficient distance to allow a rotary lawn mower to be moved on to said platform between said side walls, one of said side walls positioned opposite the discharge opening of a mower on said platform.

3. The combination in accordance with claim 1 wherein said body is unitary and said surface engaging the wheels of said grooves and ridges transverse to the direction of entrance of a rotary mower on said platform.

4. The combination in accordance with claim 3 wherein said grooves and ridges are positioned on the entrance and exit ends of said platform and opposite sides of said water discharge means for engaging the wheels of a mower on said platform.

5. The combination in accordance with claim 1 hwerein said body is of formed plastic.

6. The combination in accordance with claim 1 wherein said platform includes an integrally formed recess for said water discharge means and including means retaining said water discharge means within said recess.

* * * * *